United States Patent [19]

Moriya et al.

[11] 4,306,285
[45] Dec. 15, 1981

[54] DATA PROCESSING APPARATUS

[75] Inventors: Yoshiaki Moriya, Inagi; Ichiro Kobayashi, Kawasaki; Yukio Kitagawa, Yokohama, all of Japan

[73] Assignee: Tokyo Shibaura Denki Kabushiki Kaisha, Japan

[21] Appl. No.: 978

[22] Filed: Jan. 4, 1979

[30] Foreign Application Priority Data

Jan. 26, 1978 [JP] Japan .................................. 53-7598

[51] Int. Cl.³ .............................................. G06F 9/36
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 3,343,138 | 9/1967 | Ulrich | 364/200 |
| 3,470,537 | 9/1969 | Goshorn et al. | 364/200 |
| 3,781,823 | 12/1973 | Senese | 364/200 |
| 3,786,436 | 1/1974 | Zelinski et al. | 364/200 |
| 3,818,459 | 6/1974 | Vrablik | 364/200 |
| 3,900,385 | 8/1975 | Bell et al. | 364/200 |
| 4,050,060 | 9/1977 | Birney et al. | 364/200 |
| 4,075,688 | 2/1978 | Lynch et al. | 364/200 |

OTHER PUBLICATIONS

Motorola, M6800 Microprocessor Applications Manual, 1975, pp. 1-8, 10-19.

Primary Examiner—Mark E. Nusbaum
Assistant Examiner—Eddie P. Chan
Attorney, Agent, or Firm—Finnegan, Henderson, Farabow, Garrett & Dunner

[57] ABSTRACT

In a data processing apparatus including an instruction register and an instruction decoder connected therewith, when a designation instruction (operand changing instruction) is set in the instruction register, the operand (the code of source or destination) of the designation instruction is registered in a source address register or a designation address register connected to the instruction register through a gate circuit. The registers produce control signals through decoders respectively for selecting predetermined operands. When the designation instruction is decoded by the instruction decoder a first (for source) and a second (for destination) flip-flop circuits which are connected to the output terminal of the instruction decoder are set. The outputs of these flip-flop circuits are applied to the negative input of an AND gate circuit connected to the instruction decoder.

When an instruction to be executed subsequent to the designation instruction is decoded by the instruction decoder, the instruction decoder produces a control signal that selects the operand of the instruction, but this control signal is selectively blocked by the AND gate circuit, with the result that the operand designated by the designation instruction is substituted by the operand of the instruction to be executed subsequently.

12 Claims, 6 Drawing Figures

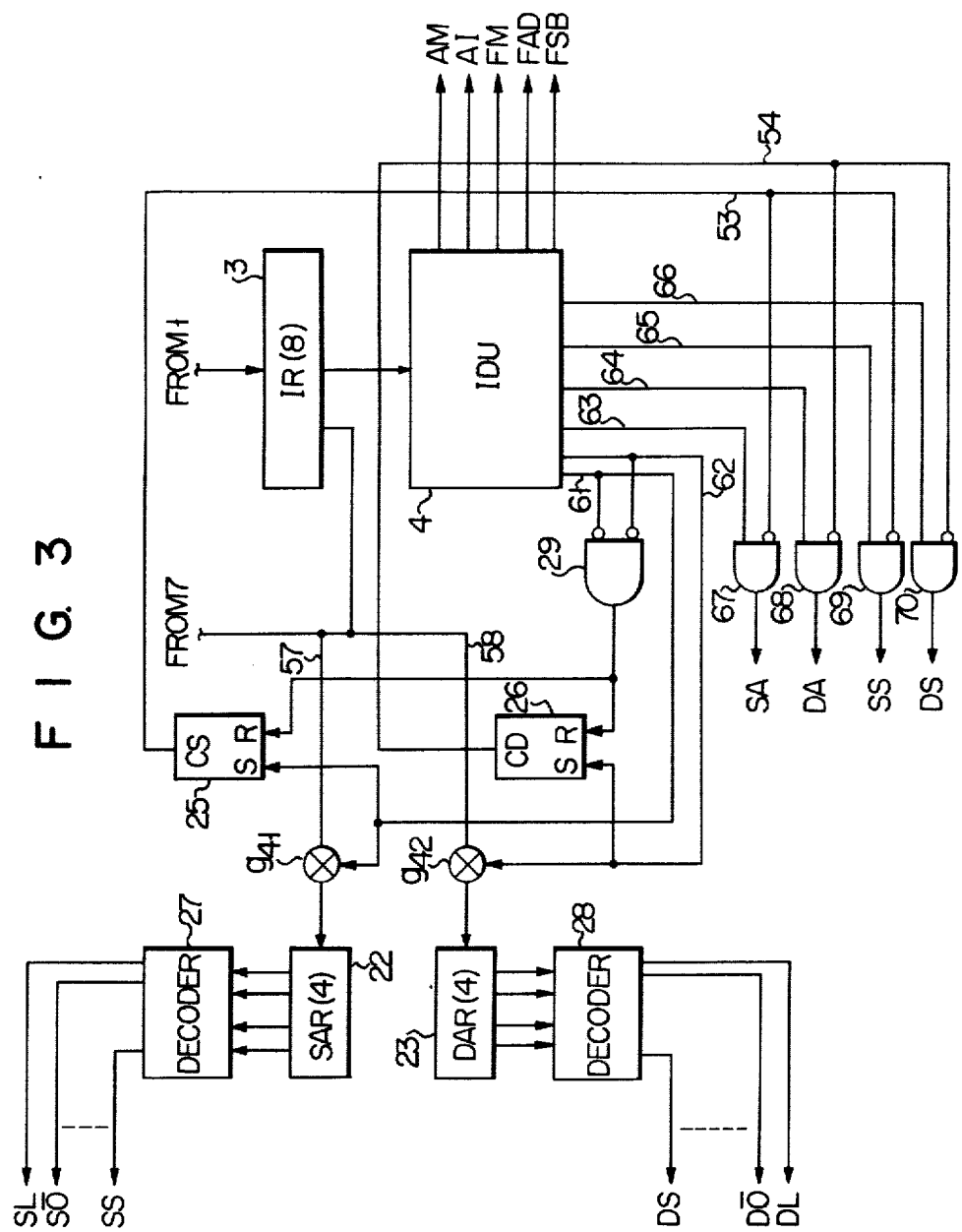
F I G. 3

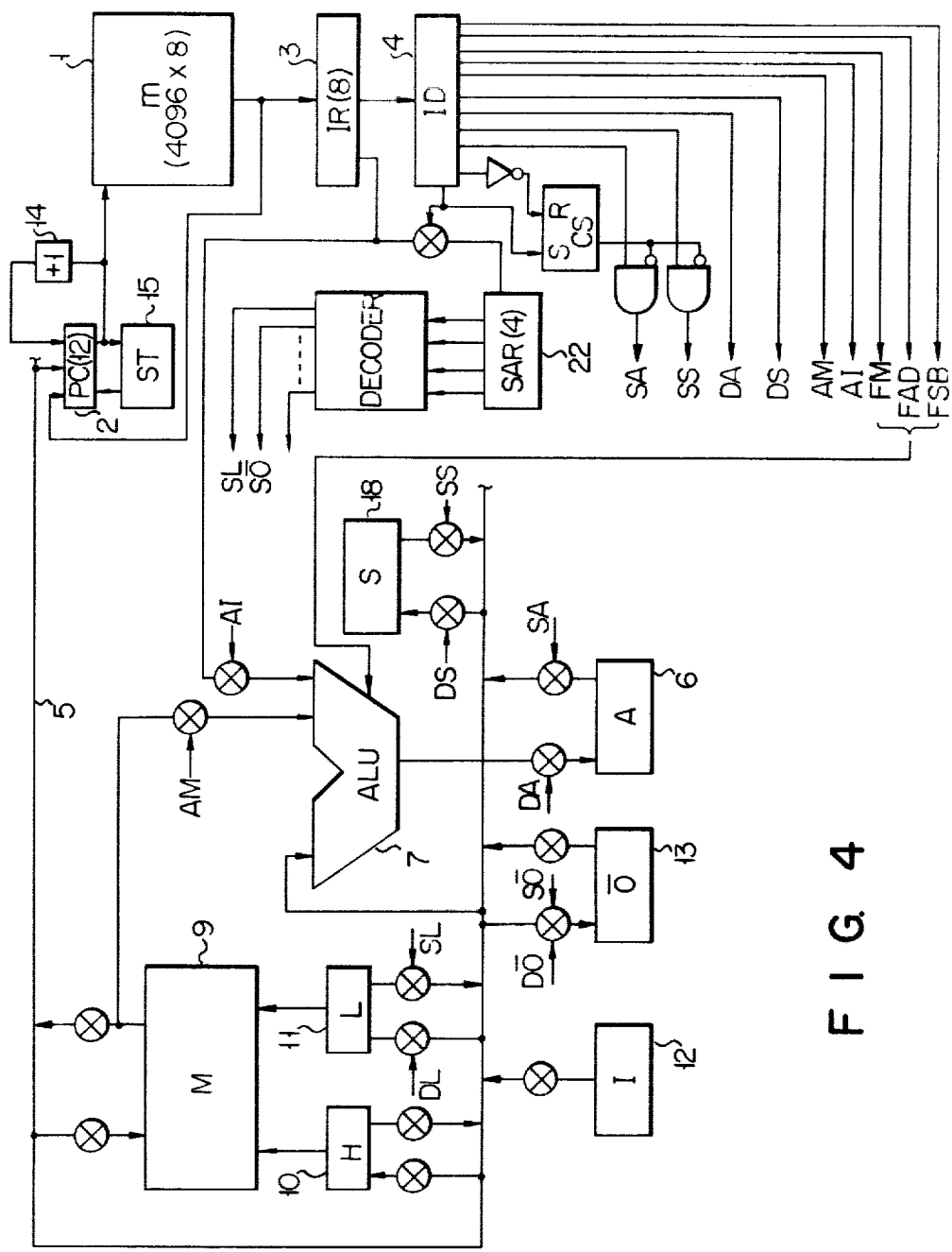
F I G. 4

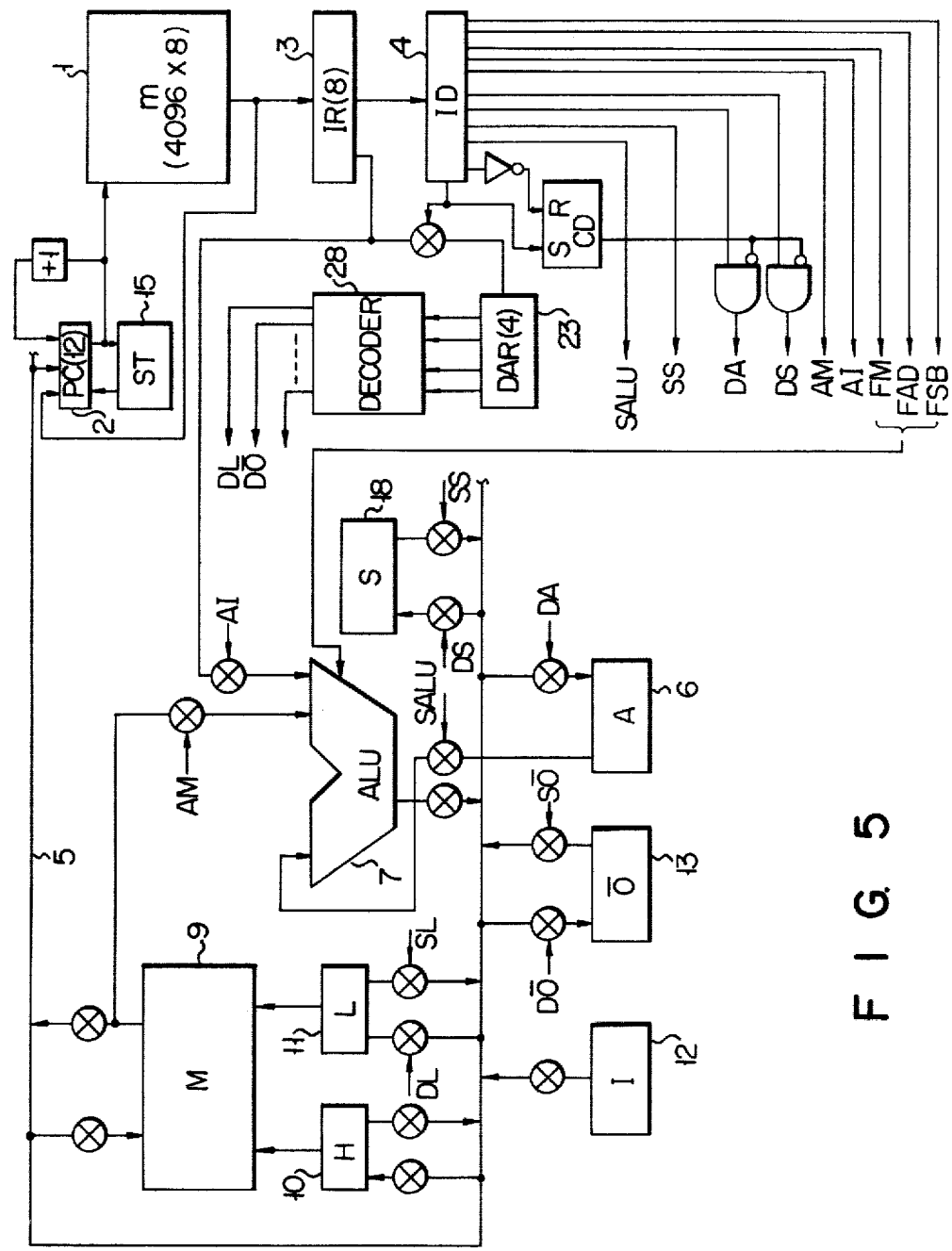
F I G. 5

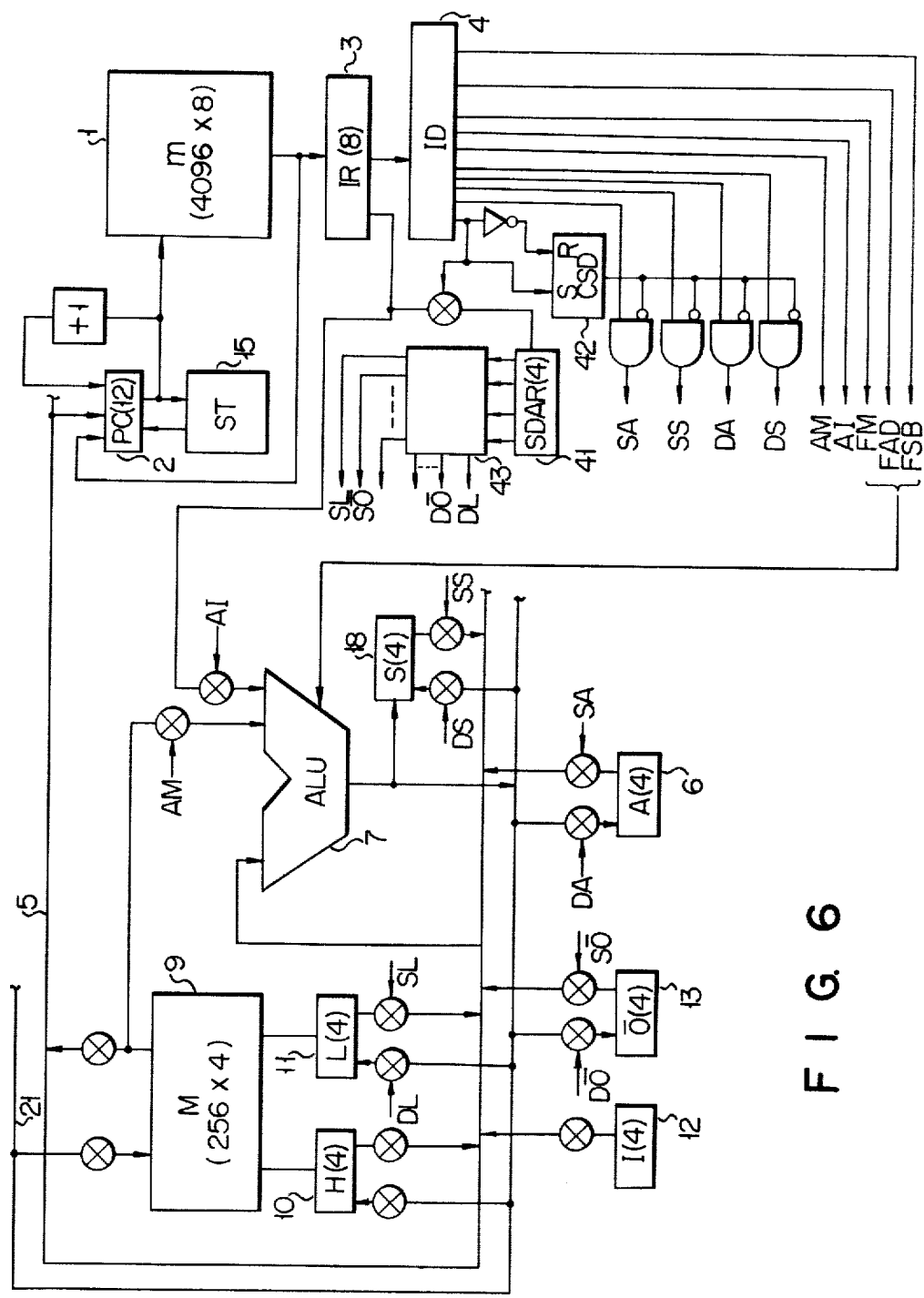
F I G. 6

DATA PROCESSING APPARATUS

BACKGROUND OF THE INVENTION (I) Field of the Invention

This invention relates to data processing apparatus for processing programs.

(II) Description of the Prior Art

As is well known in the art, data processing apparatus, for example a micro-computer, is used to process a program made up of a series of instructions. The term "instruction" (or an "instruction word") is used herein to mean a code stored in a memory device, and the data processing apparatus reads out such encoded instruction from the memory device, and then decodes the instruction for performing some sort of operation. Every instruction has a specific meaning for the data processing apparatus, and the types of different instruction range from several tens to several hundreds or more. The word length of a fundamental word is specific to a given data processing apparatus and ranges from several bits to several tens of bits or more than 100 bits. The code or bit length of an ordinary instruction is generally equal to the length of its fundamental word. The code length of certain instructions is several times the length of its fundamental word.

Considering data processing apparatus as apparatus including a memory device which stores instructions or data, it can be considered as a large sequence circuit. A sequence circuit may assume various status conditions. More particularly, it contains at least one memory element (a minimum unit of one bit) of some sort such as a memory device or a flip-flop circuit. Where the total number of bits of all memory elements of a data processing apparatus is equal to N the data processing apparatus may be considered to have available $2^N$ different status conditions where the redundancy is neglected, and a change of status means a change of a status from one of $2^N$ status conditions to the another status condition.

The term "operation" hereinafter used means such change of status, and a term "operand" generally means an object to be operated when such memory element as a memory device, a register or a flip-flop circuit is operated. In a data processing apparatus which decodes an instruction and then executes an operation, only a portion, that is a specific operand among numerous memory elements has its status changed. In a special case, the operation to be executed is to change the status of a specific operand to have the same status as another operand (assumed to have the same bit length). Such special operation is termed "transfer of data". Of the two operands participating in the transfer, the former is called the "destination", whereas the latter is called the "source". In other words, the contents of a source operand is transferred to a destination operand. The instructions of prior art data processing apparatus belong to either one of the following two types:

(I)

| Operation designator | Operand designator |

(II)

| Operation designator |

The operation designator of (I) designates the operation contents of an operand. More particularly, the contents of an operation, such as, transfer of the contents of a first operand to a second operand, or addition of the contents of the first and second operands and then transfer of the result to a third operand or a subtraction, is identified. In the operand designator, an object to be operated is determined. For example, in the transfer instruction described above, as the first operand, a designation is made to select one of a plurality of registers, or to select an input/output device. Where a memory device is to be selected it is necessary to designate an address of that memory device by some means such as directly designating the address with a code inside of the instruction or indirectly designating the address with a register. It may be considered that a code that determines the address is also included in the operand designator. When the operation designator determines the contents of a specific operation, the number of the operands of that operation would be determined. Thus, whether an operand designator designates one operand, or two operands or three operands is determined by the operation designator.

The instruction of the type (II) is a special one of type (I) where no operand designator is included in an instruction code. In this type, however, an operand to be operated is determined automatically. This means that, not only the number of the operands but also the operand itself (object to be operated) are determined solely by the operation designator (although all of the instruction code constitutes an operation designator). An operand may or may not be designated by a programmer. The example described above will now be described with reference to a prior art data processing apparatus, for example a micro-computer. In this example, for the purpose of simplifying the description, it is assumed that the word length of data is 4 bits, and that the length of the address word of a memory device is 12 bits. These word lengths are selected only for the purpose of description, and the embodiment of this invention to be described later will be described with these bit numbers but it should be understood that the invention is not limited to these specific bit numbers.

FIG. 1 illustrates one example of a prior art data processing apparatus which comprises a memory device 1 having a capacity of 4096 instruction words (each comprising a fundamental word having a length of 8 bits) for storing instructions or data. One of the 4096 addressed locations of the memory device 1 is designated by a program counter 2 which is constituted by 12 bits which is equal to the length of an address word. An instruction word in the memory device 1 designated by the program counter 2 is transferred to an instruction register 3 which is constituted by 8 bits equal to an instruction word length. The instruction transferred to the instruction register 3 is decoded by an instruction decoder 4 to produce several tens of control signals SL, SI, SIM, DA, DAA, etc. which are used to control various gate circuits $g_1$ through $g_{13}$ connected between a source and a destination.

The components described above are generally provided for a conventional data processing apparatus, but the components to be described hereinbelow are added for the sake of description. A bus 5 is provided for transferring data between respective operands. The bus 5 consists of 4 bits which is equal to the data word length. There is also provided an accumulator 6 which is constituted by a four bit register and is where most of the instructions of the arithmetic operations and the transfer operations are executed. There is also provided an arithmetic logic unit 7 (usually termed an ALU) which performes arithmetical operations such as addition, and logical operations such as logical product. The output of ALU 7 is fed back to the accumulator 6. For the purpose of identifying whether the result of the operation is a particular result or not, the output terminal of ALU 7 is connected to a flip-flop circuit 8 which is called a status flag. Furthermore, there are provided a memory device 9 which stores only data and registers 10 and 11 (termed H and L) for determining the address of the memory device 9. The memory device 9 has a capacity of 256 words (each word comprises 4 bits) and each one of the 256 addressed locations is designated by both H and L registers 10 and 11 each having 4 bits each (for a total of 8 bits). The memory device 9 and H and L registers 10 and 11 are bidirectionally connected to the bus 5. Each of an input device 12 and an output device 13 comprises a 4 bit register connected to the bus 5. Means 14 is connected to the program counter 2 for incrementing the count value thereof for enabling the counter to read out instructions in a regular order. For an ordinary instruction, the count value of the program counter 2 is incremented by means 14. For the purpose of changing the flow of the program, that is for changing the count value of the program counter 2 by means other than said means, the system is constructed to transfer data to the program counter 2 from the bus 5 and the memory device 1. A stack 15 is bidirectionally connected to the program counter 2 for the purpose of temporarily saving the contents thereof when processing subroutines or interrupts.

Some of the instructions are illstrated as follows:

| | | | |
|---|---|---|---|
| 1. | LA | 1010 $r_3 r_2 r_1 r_0$ | A ← r |
| 2. | ST | 1011 $r_3 r_2 r_1 r_0$ | r ← A |
| 3. | LAI | 0011 $i_3 i_2 i_1 i_0$ | A ← $i_3 i_2 i_1 i_0$ |
| 4. | AAI | 0010 $i_3 i_2 i_1 i_0$ | A ← A + $i_3 i_2 i_1 i_0$ |
| 5. | ADD | 01101 001 | A ← A + M |
| 6. | AND | 01011000 | A ← A ∧ M |
| 7. | JMP | 1100 $a_{11} a_{10} a_9$ | PC ← $a_{11} a_{10} a_9 a_8 a_7$ |
| | | $a_8 a_7 a_6 a_5 a_4$ | $a_6 a_5 a_4 a_3 a_2 a_1$ |
| | | $a_3 a_2 a_1 a_0$ | $a_0$ |
| 8. | CALL | 1101 $a_{11} a_{10} a_9$ | Stack ← Pc + 2 |
| | | $a_8 a_7 a_6 a_5 a_4$ | PC ← $a_{11} a_{10} a_9 a_8 a_7$ |
| | | $a_3 a_2 a_1 a_0$ | $a_6 a_5 a_4 a_3 a_2 a_1 a_0$ |
| 9. | RTN | 11110101 | PC ← Stack |
| 10. | SOB | 000111 $i_1 i_0$ | 0 < $i_1 i_0$ > 1 |
| 11. | ROB | 000110 $i_1 i_0$ | 0 < $i_1 i_0$ > ← 0 |

Where A represents the accumulator 6, r a designated register, M the memory device 9, PC the program counter 2, ST the stack 15 and O the output device 13. In the items of the instructions, the symbols, codes and the operation equations of the instructions are described in the order starting from the left sides. The LA instruction 1 belongs to the type (I) described above. The first four bits, that is 1010 correspond to an operation designator and the remaining four bits, that is $r_3 r_2 r_1 r_0$ correspond to an operand designator. The $r_3$, $r_2$, $r_1$ and $r_0$ are binary variables of which values are "0" or "1", and symbols "i" and "a" have the same meaning. With this instruction, according to the values (there are 16 values) of $r_3$, $r_2$, $r_1$ and $r_0$, the contents of the specified register are transferred to the accumulator 6. In this case, the source of the instruction is a register designated by $r_3 r_2 r_1 r_0$ whereas the destination is the accumulator 6. The registers designated as above described include H, L, I and M. When L register 11 is designated, a code $r_3 r_2 r_1 r_0$ is decoded by the instruction decoder 4 to generate the control signal SL which enebles gate circuit $g_8$ to produce the output of the L register 11 on the bus 5. By only the code 1010 of the operation designator of this LA instruction, the destination can be identified as the accumulator 6 and this code is decoded by the instruction decoder 4 to generate the control signal DA which enables gate circuit $g_{11}$ between the bus 5 and the accumulator 6 open so that the contents of the L register 11 are transferred to the accumulator 6. Where the designated register is the input device 12, the output thereof is decoded by the decoder 4 to produce control signal SI instead of SL so that the contents of the input device 12 would be transferred to the accumulator 6 as in the case of the L register. On the other hand, when the memory device 9 is designated, it becomes the source. In this case however, a word in the memory device 9 designated by the address of the contents of the H register and L register will be the object to be controlled.

ST instruction 2 is obtained by reversing the transfer objects of the LA instruction 1. wherein the source is fixed to the accumulator 6 and the destination comprises a register designated by $r_3 r_2 r_1 r_0$. The type of the instruction is (I) like instruction 1. The LAI instruction 3. also belongs to type (I). While this instruction resembles the LA instruction 1. it is different therefrom in that the source comprises immediate data which is included in the instruction code. In the case of this instruction, the instruction decoder 4 produces the control signal SIM which transfers one half of the contents of the instruction register 3, that is 4 bits to the bus 5 through gate circuit $g_9$. The AAI instruction 4 also belongs to type (I) and, similar to LAI instruction 3, produces the immediate data on the bus 5. If differs, however, in that the output of ALU 7 is then transferred to the accumulator 6 via a gate circuit $g_{12}$ under the control of the control signal DAA.

The ADD instruction 5 belongs to type (II) and all 8 bits of the code automatically determine to use the accumulator 6 and the memory device 9 as the source, and the accumulator 6 as the destination. The contents of the accumulator 6 and the memory device 9 are added together and the resulting sum is transferred to the accumulator 6. The AND instruction 6 belongs to the type (II) and the same source and the same destinations are designated as those of the ADD instruction 5. In this case, however, ALU 7 operates to produce logical products instead of sums. The JMP instruction 7 is a branch instruction having a two word length (16 bits) and belongs to the type (II). Under normal instructions of 1 through 6 the count value of the program counter 2 is incremented by 1. In this case, however, the program counter 2 itself is the object to be controlled. The source comprises a type of immediate data having 12 bits of $a_0$ through $a_{11}$ and the destination is the program counter 2. In this case, the program counter may also constitute another source and destination. The CALL instruction 8 performs the multiplex functions of executing the JMP instruction, and saving the contents of the program counter in the stack 15. This instruction is used to call a subroutine. The RTN instruction 9 is used to return from a subroutine to a main routine and also belongs to the type (II). In this case, the source comprises the stack 15 and the destination comprises the program counter 2.

The SOB instruction 10 is an input/output instruction and functions to set to state "1" only one bit among the 4 bits of the output device 13 which are designated by the code $i_1 i_0$. This instruction enables the operation of one bit unit with a data processing apparatus designed to process data having a length of 4 bits.

The ROB instruction 11 operates to reset 1 bit instead of setting 1 bit like the SOB instruction 10. In both instructions 10 and 11 only one specific bit of the output device 13 constitutes the destination. (Each one of the instructions 1 through 9 comprises 4 bits or 12 bits units.) Thus, these instructions belong to the type (I).

The instructions described above are only a portion of the entire instructions but they are typical ones. Instructions are classified into several groups according to the type of their operations, and in this example, instructions 1~3 comprise the transfer instructions, instructions 4~6 the arithmetical operation instructions, 7~9 the branch instructions and 10 and 11 the bit processing instructions. Furthermore, these instructions may be classified into types (I) and (II) mentioned above according to the manner of designating the operand. Thus, instructions LA 1, ST 2, LAI 3, AAI 4, SOB 10 and ROB 11 belong to type (I) whereas remaining instructions belong to type (II) meaning that the object to be operated is determined automatically. In the cases of instructions LAI 3., AAI 4., SOB 10. and ROB 11 the operands are limited although these instructions belong to group (I). Thus, in the case of instructions LAI and AAI, the sources are the immediate data, which does not designate a specific register. The instructions SOB and ROB control the respective bits of four bits in the output device. On the other hand, instructions LA 1 and ST 2 include valid operand designators. Where the operand designator is shortened to be less than 4 bits or where data processing apparatus employing instruction words having longer length is used, it is possible to determine the source and the destination as the operands which are determinable by the operand designator having a code that designates the respective two operands.

The most serious problem of the prior art data processing apparatus lies in that, due to the limit on the instruction word length, when the contents of the operation is special (that is the frequency of use decreases) the designated objects of operand to be operated should be limited. For example, in instructions such as LA 1 and ST 2 which are simple and used frequently for transfer, for example, it is possible to designate their operands, while in such instructions as ADD 5 and SOB 10 which are used for special operations and are used infrequently, different from simple transfer instruction, one must construct these instructions such that the operands are automatically determined and that no operand designator is contained in the entire instruction codes. Otherwise, instruction codes become deficient.

One method of solving this problem involves preparation of instructions having a length twice or three times of the fundamental word length of the instruction. To accomplish this, however, it is necessary to increase the bit number of the instruction register or to make more complicate the performance of the instruction decoder. This solution, however, accompanies such difficulties that even when the frequency of use of the instruction that executes the operation increases to some extent, (the frequency of use depends upon the field of application of the data processing apparatus and the programmer) one must use instructions having a twice or three times of length, thus, increasing the length of the program.

SUMMARY OF THE INVENTION

Accordingly, it is an object of this invention to provide an improved data processing apparatus which is constructed to execute an instruction having a single word length and can not arbitrarily designate an operand by combining it with a designation instruction thereby causing the single word length instruction to have an operand that can be designated substantially arbitrarily thus improving the performance of the operand operation and saving the program areas to use efficiently the memory device.

According to this invention, there is provided data processing apparatus comprising a memory device for storing a program; a plurality of registers connected to said memory device which can be assigned as a source register and a destination register for storing data; a program counter connected to said memory device for designating a location in said memory device; and an operand selection control means including an instruction register connected to said memory device and said program counter for holding an instruction comprised of an operation code and an operand, and produced from the memory location designated by the contents of the program counter and an instruction decoder connected to said instruction register to decode instructions for applying control information to said plurality of registers, whereby when an instruction for changing said operand is set in said instruction register, the operand of an instruction to be executed subsequently is changed to an operand which has been designated by said operand changing instruction.

More particularly, according to this invention even an instruction which is used infrequently is determined by the fundamental word length and the operand to be operated is automatically determined in the same manner as the prior art, and a special instruction, that is a "designation instruction" that can modify a automatically predetermined operand is used. Furthermore, for designating an operand, special registers are provided for a source and a destination respectively. With this arrangement, when an instruction which is not frequently used normally is executed, the operand to be operated is automatically designated. A register which is most frequently used as an operand for executing an instruction is selected as an automatically selected operand. However, when the designation instruction is executed in advance of the normal instruction, the contents of a specific register that designates the source or the destination would be determined, and an operand designated by the contents would become the object to be operated by the normal instruction. This case, thus, produces the appearance of an instruction having a length twice the fundamental word length of that which has been executed, with a frequency of use being smaller than that of the automatically designated operand. Moreover, since it is possible to use an instruction not added with an designating instruction its use is efficient.

BRIEF DESCRIPTION OF THE DRAWINGS

Other features and advantages of the device according to the invention will be made apparent from the following description of a non-limitative embodiment thereof, as illustrated by the accompanying drawings in which:

FIG. 3 is a connection diagram showing the detail of a portion of the data processing apparatus shown in FIG. 2;

FIG. 4 is a block diagram showing another embodiment of this invention;

FIG. 5 is a block diagram showing still another embodiment of this invention; and FIG. 6 is a block diagram showing yet another modification of this invention.

DESCRIPTION OF THE PREFERRED EMBODIMENTS

Figure 1:
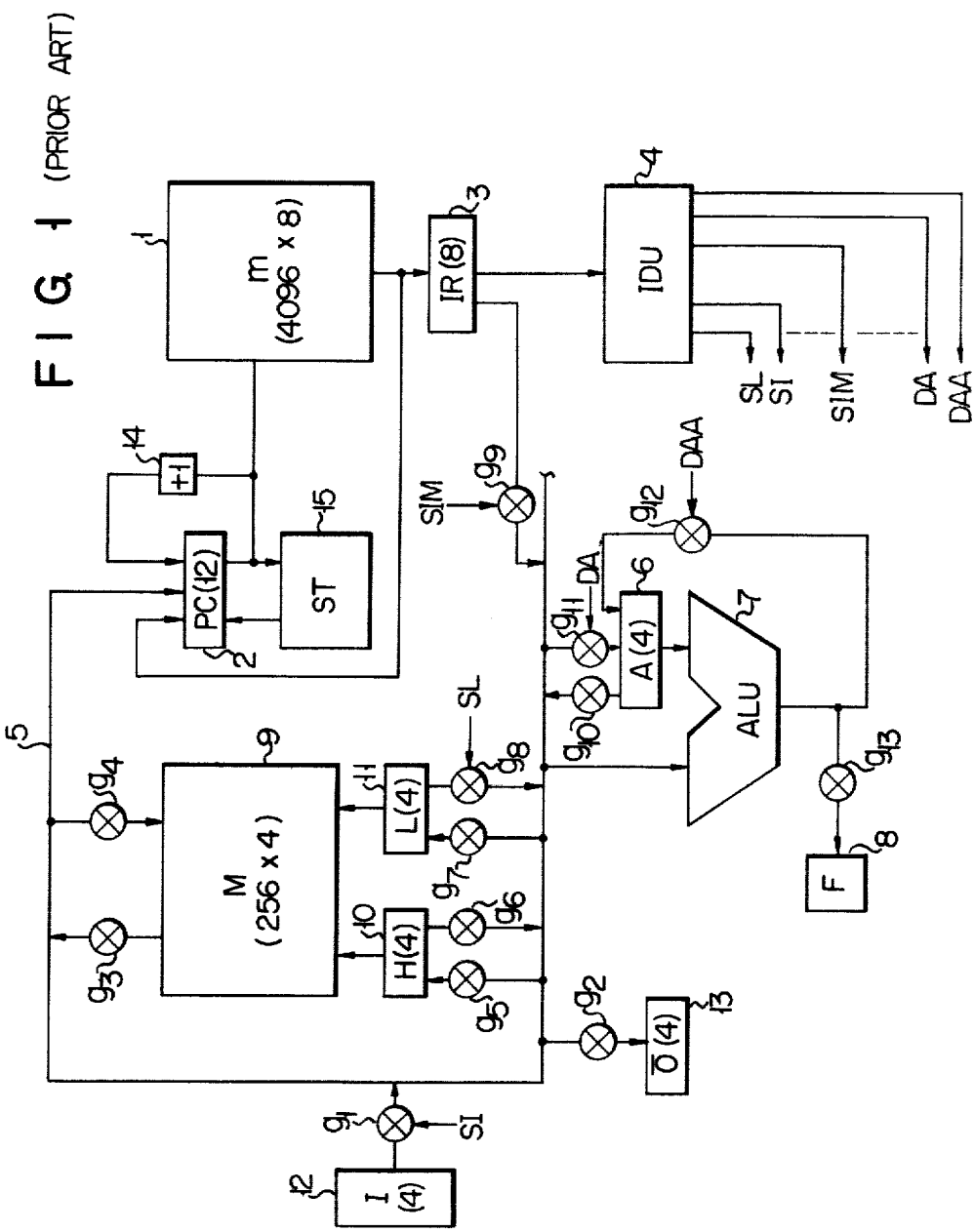
FIG. 1 is a block diagram showing the construction of the prior art data processing apparatus.
Figure 2:
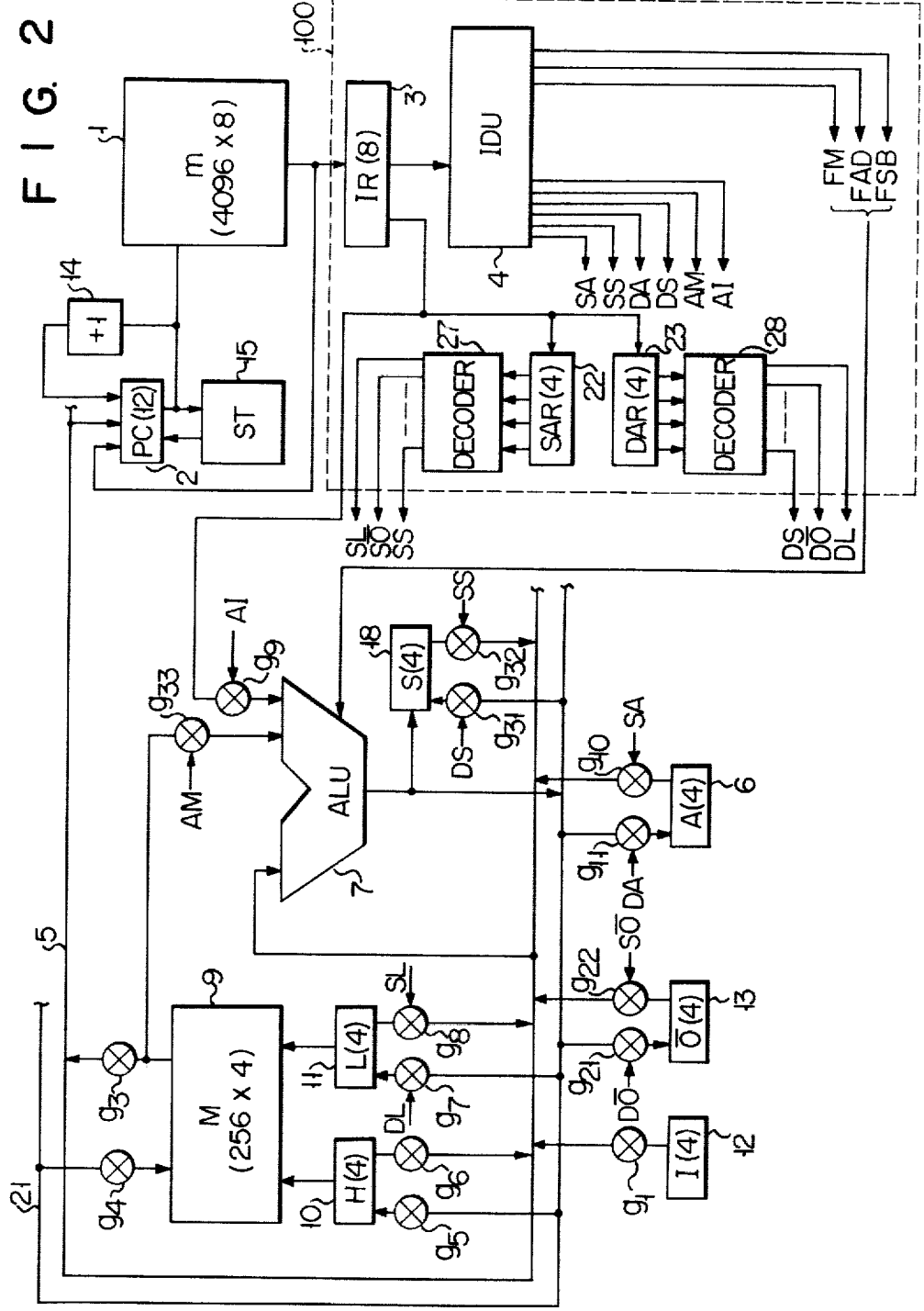
FIG. 2 is a block diagram showing the construction of one embodiment of this invention.

A preferred embodiment of this invention will be described with reference to FIG. 2 which has been improved over the prior art data processing apparatus shown in FIG. 1 by adding thereto an operand selection control circuit 100. Accordingly, corresponding elements shown in FIGS. 1 and 2 are designated by the same reference characters.

The operand selection control circuit 100 comprises an instruction register 3 connected to the memory device 1, and an instruction decoder 4 connected to the instruction register 3, a source address register 22 and a destination address register 23 which are connected to the instruction register 3. Decoders 27 and 28, respectively, are connected to the source address register 22 and the destination address register 23. In this embodiment, in addition to the operand selection control circuit 100 there is provided a destination data line 21 for the destination address register 23.

The source address register 22 and the destination address register 23 of the operand selection control circuit 100 operate to set the addresses of the source and destination by a designating instruction (to be described later) set in the instruction register 3.

The memory device 1, the program counter 2 and the instruction register 3 shown in this embodiment have the same construction as those shown in FIG. 1 so that an instruction transferred from the memory device 1 to the instruction register is decoded by the instruction decoder 4 to produce several tens of control signals as will be described later in detail. The ALU 7 performs such logical operations as arithmetical operations and logical product. One input of the ALU 7 is connected to the bus 5 while the other input selects 4 bits in the instruction register 3 or the memory device 9. The output of the ALU 7 is connected to destination data line 21. The outputs of respective registers are connected to the source bus 5 for determining which one of the registers should be selected in accordance with the output of the source address register 22, whose input is connected to the output of 4 bits in the instruction register 3. The destination data line 21 is connected to the inputs of several registers and which one of the registers should be selected is determined by the destination address register 23, whose input is connected to the output of 4 bits in the instruction register 3. The contents of the source address register 22 and of the destination address register 23 are renewed by immediate data when the "designation instruction" is executed.

Various registers include an accumulator 6, a status register 18, H and L registers 10 and 11, an input device 12, an output device 13 and a data only memory device 9 which correspond to those shown in FIG. 1. The status register 18 corresponds to the status flag 9 with added bits and comprises a 4 bit register formed by integrating flip-flop circuits that control information which identifies whether the result of operation of the ALU is a special result or not, and the permission of an interrupt. Each one of the registers including the memory device 9 is connected to produce data on the source bus 5 and to receive data from the destination data line 21, except the input device which is connected to produce data only on the source bus 5.

Among numerous control signals produced by the instruction decoder 4, a control signal SA, for example, controls the opening and closing of a gate circuit $g_{10}$ which controls the flow of data from accumulator 6 to the source data line 5, whereas control signal DA control the opening and closing of a gate circuit $g_{11}$ which controls the flow of data from the destination data line 21 to the accumulator 6. Control signal SS controls the opening and closing of a gate circuit $g_{32}$ which controls the flow of the data from the status register 18 to the source bus 5, while a control signal DS controls the opening and closing of a gate circuit $g_{31}$ that controls the flow of the data from the destination data line 21 to the status register 18. In the same manner, a control signal AM controls the opening and closing of a gate circuit $g_{33}$ that controls the flow of the data from the memory device 9 to the ALU 7, while a control signal AI controls the opening and closing of a gate circuit $g_9$ that controls the flow of data from the instruction register 3 to the ALU 7. A control signal FM controls input data applied to the ALU 7 such that the ALU 7 produces the input data without performing any computation, and the control signal FAD controls the ALU 7 to perform an addition operation and control signal FSB is used to set bits.

The detail of the operand selection control circuit 100 is shown in FIG. 3. The instruction decoder 4 produces a signal which opens a gate circuit $g_{41}$ and sets a flip-flop circuit 25 through a control line 61 when changing a source address in response to the designation instruction, and a signal which opens a gate circuit $g_{42}$ and sets a flip-flop circuit 26 through a control circuit 62 when changing the destination address. When a 4 bit data is set in the source address register 22, a decoder 27 decodes the contents of the data to produce signals SL, SO etc. for opening the gate circuits $g_8$, $g_{22}$ etc. shown in FIG. 2. When a 4 bit data is set in the destination address register 23, a decoder 28 decodes the contents of the data to produce signals DL, DO, etc. for opening the gate circuits $g_7$, $g_{21}$, etc. shown in FIG. 2.

An AND gate circuit 29 has two negative inputs connected to the lines 61 and 62 and an output connected to the reset terminals R of the flip-flop circuits 25 and 26, so that this AND gate circuit resets the flip-flop circuits 25 and 26 when instructions other than the designation instructions are executed.

One input of AND gate circuits 67 and 69 is connected to output line 53 of flip-flop circuit 25, and one input of AND gate circuits 68 and 70 is connected to output line 54 of flip-flop circuit 26. The other inputs of these AND gate circuits are connected to the output lines 63, 64, 65 and 66 respectively of the instruction decoder 4. Accordingly, where a source or destinations is not changed by a designation instruction, the AND gate circuits 67, 68, 69 and 70 are enabled to pass output control signals of the instruction decoder 4, whereas when the source or destination is changed by a designation instruction these AND gate circuits are disenabled to interrupt signals SA, DA, SS and DS.

Some of the instructions utilized in this embodiments are as follows:

| | | | |
|---|---|---|---|
| 1. | LDM | 00100110 | A ← M |
| 2. | LDA | 00101011 | A ← A |
| 3. | LDI | 0010 $i_3 i_2 i_1 i_0$ | A ← $i_3 i_2 i_1 i_0$ |
| 4. | ADI | 0111 $i_3 i_2 i_1 i_0$ | A ← A + $i_3 i_2 i_1 i_0$ |
| 5. | ADD | 00101101 | A ← A + M |
| 6. | AND | 00111100 | A ← A ∧ M |
| 7. | JMP | 1100 $a_{11} a_{10} a_9 a_8$ $a_7 a_6 a_5 a_4 a_3 a_2$ $a_1 a_0$ | PC ← $a_{11} a_{10} a_9 a_8 a_7 a_6$ $a_5 a_4 a_3 a_2 a_1 a_0$ |
| 8. | CALL | 1101 $a_{11} a_{10} a_9 a_8$ $a_7 a_6 a_5 a_4 a_3 a_2$ $a_1 a_0$ | Stack ← PC + 2 PC ← $a_{11} a_{10} a_9 a_8 a_7 a_6$ $a_5 a_4 a_3 a_2 a_1 a_0$ |
| 9. | RTN | 00100111 | PC ← Stack |
| 10. | SSB | 000101 $i_1 i_0$ | S < $i_1 i_0$ > ← 1 |
| 11. | RSB | 000111 $i_1 i_0$ | S < $i_1 i_0$ > ← 0 |
| 12. | DSR | 1010 $i_3 i_2 i_1 i_0$ | SA ← $i_3 i_2 i_1 i_0$ |
| 13. | DDR | 1001 $i_3 i_2 i_1 i_0$ | DA ← $i_3 i_2 i_1 i_0$ |
| 14. | DSD | 1000 $i_3 i_2 i_1 i_0$ | SA ← $i_3 i_2 i_1 i_0$ DA ← $i_3 i_2 i_1 i_0$ |

The LDM instruction 1 is an instruction for transferring the contents (an address is determined by the H and L registers) of the memory device 9 to the accumulator 6. The instruction 2 is an instruction for transferring contents of the accumulator 6 to itself. Thus when this instruction is used singly, no change is effected (although the count value of the program counter is incremented) but when used in combination with a designation instruction it is effective. Instructions 3 through 9 are the same as those of the prior art. Instructions 10 and 11 are bit processing instructions and are used herein to set or reset the respective bits in the status register 18 instead of in the output device 13.

Instructions 12, 13 and 14 are newly introduced "designation instructions". To distinguish instructions 1 through 11 from the designation instructions, the formers are termed "processing instructions". The DSR instruction 12 is used to set the immediate data $i_3 i_2 i_1 i_0$ into the source address register 22 for changing the source operand of the processing instruction following the instruction 12. The DDR instruction 13 is used to set the immediate data $i_3 i_2 i_1 i_0$ in the destination address register 23 for changing the destination operands of the processing instructions following the instruction 13. The DSD instruction 14 is used to set the immediate data in both of the source address register 22 and the destination address register 23 for changing the operands of the source and destinations of the processing operations succeeding the instruction 14.

When the LDM instruction 1 is used singly, the instruction decoder 4 produces control signals DA, AM and FM, of which signal AM opens one input gate circuit $g_{33}$ to the ALU 7 whereby the ALU 7 is controlled by the control signal FM such that it produces its input as its output without any processing. Accordingly, the contents of the memory device 9 designated by the H register 10 and the L register 11 is produced on the designation data line 21. Since the control signal DA is being applied to the input gate circuit $g_{11}$ of the accumulator 6, the contents of the memory device 9 produced on the data line 21 would be transferred to the accumulator 6.

When the ADI instruction is used singly, the instruction decoder 4 produces control signals SA, DA, AI and FAD. Since the gate circuit $g_{10}$ is opened by the control signal SA, the contents of the accumulator 6 is produced on the bus 5. As one input of the ALU 7 is connected to the bus 5, the contents of this input appears on the output of the ALU 7. Furthermore, since the gate circuit $g_9$ is opened by the control signal AI, the other input of the ALU 7 receives the immediate data produced by the instruction register 3. As the ALU 7 is controlled to perform an addition operation by the control signal FAD the sum of the contents of the output of the accumulator 6 and the immediate data would appear on the destination data line 21. Since the input gate $g_{11}$ of the accumulator 6 is being supplied with the control signal DA, the sum on the data line 21 would be transferred to the accumulator 6.

When the SSB instruction 10 is used singly, the instruction decoder 4 produces control signals SS, DS, AI and FSB. Since the gate circuit $g_{32}$ is being supplied with the control signal SS, the contents of the status register 18 would appear on the bus 5. Consequently, the contents of the status register 18 is applied to one input of the ALU 7 while the other input thereof receives the immediate data as in the case of the instruction 4. Since the ALU 7 is controlled to set one bit by the control signal FSB, the contents of the status register 18, wherein of the 4 bits thereof one bit has been set to "1", would appear on the destination data line 21. Further, as the control signal DS is supplied to the input gate circuit $g_{31}$ of the status register 18, only one bit thereof would be set to "1".

When the DDR instruction 13 is executed prior to the execution of the LDM instruction 1, the instruction decoder 4 produces a high level signal on the control line 62. As a consequence, the gate circuit $g_{42}$ is opened and a 4 bit code is supplied to the destination address register 23 from the instruction register 3 through the data line 58. If the code $i_3 \sim i_0$ designates the output device 13, the contents of the destination address register 23 is changed to a code that designates the output device 13 after the instruction DDR has been executed.

The high level signal produced on the control line 62 sets the flip-flop circuit 26. Then the instruction LDM, one of the processing instructions, is executed. At this time, the destination address register 23 produces a control signal DO through the decoder 28. Furthermore, a high level signal is supplied to one input of the AND gate circuit 68 through line 64 while the other input receives an inverted high level output of the flip-flop circuit 26 through line 54. Consequently, this AND gate circuit 68 is not able to pass the control signal DA.

Thus, the operation up to a time when the contents of the memory device 9 is produced on the destination data line 21 is the same as the operation executed by using the LDM instruction singly, but as the input gate circuit $g_{21}$ to the output device 13 is opened by the control signal DO the contents of the memory device 9 is transferred to the output device 13 whereas the contents of the accumulator 6 is not changed. In this manner, in response to the DDR instruction, the destination operand is changed from the accumulator which is determined automatically from the LDM instruction to the output device 13. Depending upon the code $i_3 \sim i_0$ of the DDR instruction, the changed operand may comprise the L register 11, the H register 10 and S register 18 and is not limited to the output device 13.

Suppose now that prior to the ADI instruction 4, the DSD instruction 14 is to be executed. In this case, the instruction decoder 4 produces control signals that are supplied through control lines 61 and 62 to gate circuits $g_{41}$ and $g_{42}$ for opening the same with the result that 4 bit code $i_3 \sim i_0$ is sent to the destination address register 23 and the source address register 22 over data lines 57 and 58. Consequently, when this 4 bit code is a code that designates the L register 11, the contents of the destination address register 23 and the source address register 22 is a code that designates the L register 11. The high level signal produced on the control lines 61 and 62 sets the flip-flops 25 and 26. Then, the processing instruction ADI 4 will be executed. At this time, the source address register 22 produces a control signal SL through the decoder 27 whereas the destination address register 23 produces a control signal DL through decoder 28.

The high level signal produced on the control lines 63 and 64 by the instruction decoder 4 is applied to one of the inputs of the AND gate circuits 67 and 68. However, as the flip-flop circuits 25 and 26 are in their set state, the other inputs of the AND gate circuits 67 and 68 receive inverted low level signals. Thus, the AND gate circuits 67 and 68 are disenabled so that the control signals SA and DA are not passed. Consequently, the gate circuit $g_8$ is opened by the control signal SL so that the contents of the L register 11 appears on the source bus 5, and the output of the ALU 7 corresponds to the sum of the contents of the L register and the immediate data. Also as the gate circuit $g_7$ is opened by the control signal DL so as to apply the data on the destination data line 21 to the L register 11, the sum of the contents of the L register and the immediate data would be transferred to the L register 11. Consequently, the instruction ADI which originally executes immediate adding operation when it is used singly is changed to execute the immediate adding operation of L register by the instruction DSD being executed prior to the ADI. Of course, depending upon the type of the code the destination can be changed to not only L register but also H register 10, memory device 9, etc.

Let us now consider a case wherein the DSD instruction 14 is to be executed prior to the execution of the SSB instruction 10. Assume now that when the code $i_3 \sim i_0$ designates the output device 13, after the instruction DSD has been executed the contents of both of the source address register 22 and the destination address register 23 are changed to a code that designates the output device 13. Thereafter, when the processing instruction SSB is executed, the control signal SO is produced by the output of the source address register 22 while the control signal DO is produced by the output of the destination address register 23. Accordingly, the control signals SS and DS generated by the instruction decoder 4 are decoded so that the gate circuit $g_{22}$ is opened by the control signal SO to produce the contents of the output device 13 on the source bus 5, and the output of the ALU 7 becomes equal to the contents of the output device 13 in which one bit thereof has been set to "1". Since the gate circuit $g_{21}$ which supplies data to the output device 13 from the destination data line 21 is opened by the control signal DO, "1" would be set in only one bit of the contents of the output device 13. In this manner, by executing the SSB instruction which is adapted to process the bits of only the status register prior to the execution of the instruction DSD the instruction SSB becomes a processing instruction for the bits of the output device 13. Of course, depending upon the type of the code, the object of the bit processing is not limited to the status register 18 and the output device 13, but may be the accumulator 6, the L register 11 or the memory device 9. With regard to the bit processing instruction the status register is used as the standard operand or the automatically determined operand instead of the accumulator, because the status register is an assembly of one bit flip-flop circuits which represent various status in the computer. The contents of the status register is made up of a carry information utilized for the computation of the ALU and a flip-flop circuit that permits interrupt. As above described, since the status register is required to be set and reset in terms of bit units it is selected as the standard operand. Then, it may be considered that the SSB instruction and the RSB instruction are instructions comprising combinations of the set and reset instructions for the carry, permission and inhibition instructions of interrupt. For this reason, it is not necessary to individually prepare instructions corresponding to these instructions, thereby simplifying the circuit construction.

For the reason described above, registers which are used most frequently are selected as the standard operand. So long as a designation instruction is used it becomes possible to perform special operations with registers which are not used so frequently.

Although in the foregoing description one designation instruction was executed prior to the execution of the processing instructions, it is also possible to execute a plurality of designation instructions prior to one processing instruction to change variously the operands of the source and destination. Thus, for example, after designating the input device 12 with the instruction DSR and the output device 12 with the DDR instruction, when the ADD instruction 3 is executed thereafter the contents of the input device 12 and of the memory device 9 are added together and then the sum is supplied directly to the output device 13. It is to be noted that the contents of the accumulator 6 is preserved without being destroyed.

In the embodiment shown in FIG. 2, the contents of the source address register 22 and the destination address register 23 are supplied from the instruction register 3. That is a direct designation since a sort of immediate data is supplied to them. But it is also possible to indirectly designate. For example, it is possible to prepare such designation instruction which transfers the contents of the L register 11 directly to the destination address register. Then the modified destination operand would be designated indirectly by the contents of the L register 11.

Although in the embodiment shown in FIG. 2, two types of designation registers (that is the source address register 22 and the destination address register 23) are used, either one of them may be used.

FIG. 4 shows a modification which utilizes only the source address register 22. In this case, since it is not necessary to take into consideration the destination operand, the DDR instruction 13 and the DSD instruction 14 are not used. Moreover, as it is not necessary to separate the source and the destination, only the bus 5 is used as the data transmission path between registers so that the data line 21 is not used. In this case, the control signals regarding the destination operands are prepared by the instruction decoder 4. Since the output of the ALU 7 is limited to only the accumulator 6, the ST instruction 2 utilized in the first embodiment is not necessary.

FIG. 5 shows another embodiment wherein only the destination address register DAR is used. In this case, since it is not necessary to take into consideration the source operand, the DSR instruction 12 and the DSD instruction 14 are not used. Furthermore, the bus 5 is used as the data transmission line. In this case, control signals regarding the source operand are prepared by the instruction decoder 4. Since only the output of the accumulator 6 is applied to the lefthand input of the ALU 7, the LA instruction 1 utilized in the first embodiment is not necessary. In this embodiment, signal SALU is used to control a gate circuit provided for transferring data from accumulator 6 to ALU 7.

FIG. 6 shows still further modification of this invention wherein the source address register 22 and the destination address register 23 are combined into a single register 41 (SDAR) for the purpose of decreasing the type of the designation instructions. In this embodiment, the flip-flop circuits 25 and 26 shown in FIG. 3 are combined into a single flip-flop circuit 42 and decoders 27 and 28 are combined into a single decoder 43. The signals SL, SO . . . and DL, DO . . . produced by this decoder may be the same in certain cases.

According to this invention, it is possible to prepare many types of the designation registers. Although in this embodiment independent source and destination are used, it is possible to prepare a complicated instruction which operates data from a plurality of sources to a plurality of destinations, in which case a designation register corresponding to the number of the sources and destinations is prepared. For example, in the embodiment shown in FIG. 2, two inputs are applied to the ALU 7. The contents of the respective registers designated by the source address register 22 is produced on the bus 5 for one of the two inputs. To the other input is applied one of the immediate data either the output of the memory device 9 or the one of the instruction register 3 depending on the respective instructions. In this case, however, it is possible to use for this input another designation register independent of the source address register for selecting different registers.

With regard to the JMP instruction 7, CALL instruction 8 and the RTN instruction 9 which act as branch instructions, the program counter and the stack are automatically designated as the source and destination so that it is also possible to control these instructions by the designation instruction. By utilizing this fact, it is possible to provide a plurality of branches and to permit a plurality of returns from a subroutine.

What we claim is:

1. A data processing apparatus comprising:
   a memory device for storing a program including processing instructions comprising an operation code and an operand code, and designation instructions for changing the operand code of said processing instructions;
   a plurality of registers;
   a program counter connected to said memory device for designating a series of said instructions by designating a plurality of locations in said memory device;
   an instruction register connected to said memory device and to said program counter for holding an instruction designated by said program counter;
   instruction decoder means for decoding instructions held in said instruction register;
   control means, responsive to a processing instruction being decoded by said instruction decoder, for selecting one of said plurality of registers designated by the operand code of said processing instruction;
   alternative register selection means, coupled to said instruction decoder means and responsive to a designation instruction being decoded by said instruction decoder prior to decoding of said processing instruction, for selecting one of said plurality of registers designated by said designation instruction upon subsequent execution of the operation code of said processing instruction; said alternative register selection means including: (i) gate circuit means; (ii) register means, connected to said instruction register through said gate circuit means, for storing in said register means an operand code of a designation instruction entered into said instruction register; (iii) operand code decoder means, connected to said register means, for decoding said operand code stored in said register means so as to select a predetermined one of said plurality of registers in accordance with said operand code; and (iv) means for accessing the contents of the register selected by said alternative register selection means and for utilizing such contents as the operand of said processing instruction, while preventing use of the contents of said register selected by said control means as the operand of said subsequently executed processing instruction.

2. The data processing apparatus according to claim 1 wherein said register means comprises a source address register and a destination address register.

3. A data processing apparatus comprising:
   a memory device for storing a program including processing instructions comprising an operation code and an operand code, and designation instructions for changing the operand code of said processing instructions;
   a plurality of registers;
   a program counter connected to said memory device for designating a series of said instructions by designating a plurality of locations in said memory device;
   an instruction register connected to said memory device and to said program counter for holding an instruction designated by said program counter;
   instruction decoder means for decoding instructions held in said instruction register;
   control means, responsive to a processing instruction being decoded by said instruction decoder, for selecting one of said plurality of registers designated by the operand code of said processing instruction; and
   alternative register selection means, coupled to said instruction decoder means and responsive to a designation instruction being decoded by said instruction decoder prior to said processing instruction, for selecting one of said plurality of registers designated by said designation instruction upon subsequent execution of the operation code of said processing instruction; said alternative register selection means including: (i) a logic circuit having at least one flip-flop circuit which is connected to said instruction decoder means and which is set when said designation instruction is decoded by said instruction decoder means and reset when an instruction other than a designation instruction is decoded by said instruction decoder means, and (ii) means connecting said flip-flop circuit to said control means responsive to said designation instruction being decoded by said instruction decoder means, for preventing said control means from selecting said register designated by said processing instruction; and (iii) means for accessing the contents of the register designated by said alternative register selection means and for utilizing such contents as the operand of said subsequently executed processing instruction.

4. The data processing apparatus according to claim 3 wherein said flip-flop circuit comprises first and second flip-flop circuits which are connected to said instruction decoder and at least one of which are set when said designation instruction is decoded by said instruction decoder and reset when an instruction other than a designation instruction is decoded by said instruction decoder.

5. The data processing apparatus according to claim 3, wherein said alternative register selection means further includes a gate circuit; a source address register connected to said instruction register by said gate circuit for setting therein a code representing a register designated by said designation instruction; and a decoder connected to said source address register to decode said code and, in response thereto, to produce a control signal which selects said designated register.

6. The data processing apparatus according to claim 3, wherein said alternative register selection means further includes a gate circuit; a destination address register connected to said instruction register by said gate circuit for setting therein a code representing a register designated by said designation instruction; and a decoder connected to said designation address register for producing a control signal which selects said designated register.

7. The data processing apparatus according to claim 3 wherein said flip-flop circuit is set when a designation instruction for changing the source or destination designated by the operand code of a processing instruction is decoded by said instruction decoder means and reset when an instruction other than a designation instruction is decoded by said instruction decoder means; and in response to the status of said flip-flop circuit, said instruction decoder is prevented from producing control information which selects a source or destination designated by the operand code of an instruction to be executed after said designation instruction is decoded by said instruction decoder.

8. The data processing apparatus according to claim 3, wherein said alternative register selection means further includes a gate circuit; and a source/destination address register connected to said instruction register through said gate circuit for storing therein a code representing the source or destination designated by said designation instruction; and a decoder connected to said source/destination address register for decoding the source/destination address stored in said source/destination address decoder, and, in response thereto, to produce a control signal that selects one of said plurality of registers as a source/destination register.

9. Data processing apparatus comprising a memory device for storing a program including processing instructions and designation instructions;
- a plurality of registers connected to said memory device which are available for use in connection with the execution of said processing instructions;
- a program counter connected to said memory device for designating a location of said memory device;
- an instruction register connected to said memory device and said program counter for holding an instruction outputted from a location of said memory device designated by said program counter
- an instruction decoder connected to said instruction register for decoding an instruction held in said instruction register to supply control information to said plurality of registers;
- a flip-flop circuit connected to said instruction decoder to be set when a designation instruction is decoded by said instruction decoder and reset when an instruction other than a designation instruction is decoded by said instruction decoder;
- a logical circuit connected to said flip-flop circuit and to said instruction decoder for preventing, in response to the status of said flip-flop circuit, said instruction decoder from producing control information that selects an operand for an instruction to be executed next when a designation instruction is decoded by said instruction decoder;
- an address register;
- a gate circuit coupled between said address register and said instruction register, for passing a code to said address register representing the one of said plurality of registers which is designated by said designation instruction held in said instruction register;
- a decoder connected to said address register to produce, in response to said code, a control signal which selects said one of said plurality of registers designated by said designation instruction, in place of the operand designated by an instruction to be executed next; and
- means responsive to said control signal for accessing the contents of the selected register and for utilizing such contents as the operand of the next processing instruction to be executed.

10. Data process apparatus comprising a memory device for storing a program including processing instructions and designation instructions;
- a plurality of registers connected to said memory device which are available for use in connection with the execution of said processing instructions;
- a program counter connected to said memory device for designating a location in said memory device;
- an instruction register connected to said memory device and said program counter for holding an instruction outputted from a location in said memory device designated by the contents of said program counter;
- an instruction decoder connected to said instruction register for decoding an instruction held in said instruction register to supply control information to said plurality of registers;
- a flip-flop circuit connected to said instruction decoder to be set when a designation instruction is decoded by said instruction decoder and reset when an instruction other than a designation instruction is decoded by said instruction decoder;
- a logic circuit connected to said flip-flop circuit and to said instruction decoder for preventing, in response to the status of said flip-flop circuit, said instruction decoder from producing control information that selects a source operand designated by a processing instruction to be executed next when said designation instruction is decoded by said instruction decoder;
- a source address register;
- a gate circuit coupled between said source address register and said instruction register for passing a code to said source address register representing the address designated by said designation instruction register in said instruction register;

a decoder connected to said source address register to produce, in response to said code, a control signal which selects the one of said plurality of registers designated by said designation instruction to be used as a source by said instruction to be executed next instead of the operand designated by said instruction to be executed next; and means responsive to said control signal for accessing the contents of the selected register and for utilizing such contents as the operand of the next processing instruction to be executed.

11. Data processing apparatus comprising a memory device for storing a program including processing instructions and designation instructions;

a plurality of registers connected to said memory device which are available for use in connection with the execution of said processing instructions;

a program counter connected to said memory device for designating a location in said memory device;

an instruction register connected to said memory device and said program counter for holding an instruction outputted from a location in said memory device designated by the contents of said program counter;

an instruction decoder connected to said instruction register for decoding an instruction held in said instruction register to supply control information to said plurality of registers;

a flip-flop circuit connected to said instruction decoder to be set when a designation instruction is decoded by said instruction decoder and reset when an instruction other than said designation instruction is decoded by said instruction decoder;

a logic circuit connected to said flip-flop circuit and to said instruction decoder for preventing, in response to the status of said flip-flop circuit, said instruction decoder from producing control information that selects a destination operand designated by a processing instruction to be executed next when said designation instruction is decoded by said instruction decoder;

a destination address register;

a gate circuit coupled between said destination address register and said instruction register for passing a code to said destination address register representing the address designated by said designation instruction in said instruction register;

a decoder connected to said destination address register to produce, in response to said code, a control signal which selects the one of said plurality of registers designated by said designation instruction to be used as a destination by said instruction to be executed next instead of the operand designated by said instruction to be designated next; and means responsive to said control signal for accessing the contents of the selected register and for utilizing such contents as the operand of the next processing instruction to be executed.

12. Data processing apparatus comprising a memory device for storing a program including processing instructions and designation instructions;

a plurality of registers connected to said memory device which are available for use in connection with the execution of said processing instructions;

a program counter connected to said memory device for designating a location in said memory device;

an instruction register connected to said memory device and said program counter for holding an instruction outputted from a location in said memory device designated by the contents of said program counter;

an instruction decoder connected to said instruction register for decoding an instruction held in said instruction register to supply control information to said plurality of registers;

a flip-flop circuit connected to said instruction decoder to be set when a designation instruction is decoded by said instruction decoder and reset when an instruction other than a designation instruction is decoded by said instruction decoder;

a logic circuit connected to said flip-flop circuit and said instruction decoder for preventing, in response to the status of said flip-flop circuit, said instruction decoder from producing control information that selects a source/destination operand designated by a processing instruction to be executed next when said designation instruction is decoded by said instruction decoder;

a source/destination address register;

a gate circuit coupled between said source/destination address register and said instruction register for passing a code to said source/destination address register representing the address designated by said designation instruction in said instruction register;

a decoder connected to said source/destination address register to produce, in response to said code, a control signal which selects the one of said plurality of registers designated by said designation instruction to be used as a source/destination by said instruction to be executed next instead of the operand designated by said instruction to be designated next; and means responsive to said control signal for accessing the contents of the selected register and for utilizing such contents as the operand of the next processing instruction to be executed.

* * * * *